US012811968B2

(12) United States Patent
Pourzandi et al.

(10) Patent No.: US 12,811,968 B2
(45) Date of Patent: Nov. 24, 2026

(54) PROACTIVE MALICIOUS ACTOR MONITORING IN A NETWORK USING A VIRTUAL SECURITY AGENT (VSA)

(71) Applicant: Telefonaktiebolaget LM Ericsson (publ), Stockholm (SE)

(72) Inventors: Makan Pourzandi, Montreal (CA); Zhongwen Zhu, Saint-Laurent (CA)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 144 days.

(21) Appl. No.: 18/834,057

(22) PCT Filed: Feb. 8, 2022

(86) PCT No.: PCT/IB2022/051129
§ 371 (c)(1),
(2) Date: Jul. 29, 2024

(87) PCT Pub. No.: WO2023/152535
PCT Pub. Date: Aug. 17, 2023

(65) Prior Publication Data

US 2025/0141900 A1 May 1, 2025

(51) Int. Cl.
*H04L 9/40* (2022.01)
*H04L 41/40* (2022.01)
*H04L 43/0876* (2022.01)

(52) U.S. Cl.
CPC .......... *H04L 63/1425* (2013.01); *H04L 41/40* (2022.05); *H04L 43/0876* (2013.01); *H04L 63/20* (2013.01)

(58) Field of Classification Search
CPC . H04L 63/1425; H04L 41/40; H04L 43/0876; H04L 63/20; H04L 43/16; H04L 43/20; H04L 63/1408
See application file for complete search history.

(56) References Cited

U.S. PATENT DOCUMENTS 9,866,435 B2 1/2018 Amato
10,484,331 B1 11/2019 Rossman
(Continued)

FOREIGN PATENT DOCUMENTS

EP 2645635 A1 * 10/2013 ............ H04L 43/12

OTHER PUBLICATIONS

International Search Report and Written Opinion dated Oct. 10, 2022 filed in PCT Application No. PCT/IB2022/051129 filed Feb. 8, 2022, consisting of 12 pages.

*Primary Examiner* — Anh Nguyen
(74) *Attorney, Agent, or Firm* — Weisberg I.P. Law, P.A.

(57) ABSTRACT

According to some embodiments, an orchestrator node is configured to receive an indication of a first plurality of wireless devices where each wireless device of the first plurality of wireless devices meets a first criteria associated with a first level of monitoring of bi-directional network communications; in response to the indication of the first plurality of wireless devices, configure a second VSA to monitor communications associated with each of the first plurality of wireless devices; receive, from the second VSA, an indication of a first subset of the first plurality of wireless devices where each wireless device of the first subset of the first plurality of wireless devices meets a second criteria associated with a second level of monitoring of bi-directional network communications; and modify a granularity of wireless device monitoring.

22 Claims, 9 Drawing Sheets

(56) References Cited

U.S. PATENT DOCUMENTS

| | | | | |
|---|---|---|---|---|
| 2015/0095788 | A1* | 4/2015 | Thiele | H04L 41/0897 715/735 |
| 2016/0285783 | A1* | 9/2016 | Uriel | G06F 11/30 |
| 2017/0359217 | A1 | 12/2017 | Ahuja et al. | |
| 2020/0162309 | A1* | 5/2020 | Serban | H04B 3/56 |
| 2021/0329011 | A1* | 10/2021 | Shaw | H04L 63/1416 |

* cited by examiner

PROACTIVE MALICIOUS ACTOR MONITORING IN A NETWORK USING A VIRTUAL SECURITY AGENT (VSA)

CROSS-REFERENCE TO RELATED APPLICATION

This application is a Submission Under 35 U.S.C. § 371 for U.S. National Stage Patent Application of International Application Number: PCT/IB2022/051129, filed Feb. 8, 2022 entitled "PROACTIVE MALICIOUS ACTOR MONITORING IN A NETWORK USING A VIRTUAL SECURITY AGENT (VSA)," the entirety of which is incorporated herein by reference.

TECHNICAL FIELD

Network security and in particular, dynamic virtual security agent (VSA) based monitoring in a network.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

In particular, the 5G user plane carries a large bandwidth for transferring the data packets, additionally in several use cases (e.g., ultra-reliable low-latency communication (ULLC) there are constraints on the response time which may make efficient security mechanisms in a security management architecture important in 5G networks as some security mechanisms cause additional delay for these types of communications. FIG. 1 is a diagram of an example of an existing security management architecture. FIG. 2 is diagram of an example of another existing security management architecture. For example, if an anomaly is detected in a network where a network entity in the security management architecture may trigger one or more of Network Security Appliances (NSA) (e.g., security agents (SAs)) such as intrusion detection system (IDS), deep packet inspection (DPI), firewall (FW), etc. to investigate the source of the anomaly in the network. This leads to the monitoring of network traffic of all wireless devices in the system as the network investigates all wireless devices until a source of the anomaly is determined.

However, there are several issues with such an investigation performed by existing systems. For example, monitoring all wireless devices in the system using network security appliances until a source of the anomaly is found may cause too much delay for certain types of communication such as for ULLC. Further, applying the same network security appliance to all wireless devices in the network until the source of the anomaly is found may be inefficient.

SUMMARY

Some embodiments advantageously provide a method and system for dynamic virtual security agent (VSA) based monitoring in a network.

For example, in one or more embodiments, the system proactively finds the potential attackers in the network by placing VSA in the operator's network dynamically in terms of physical locations as well as different layers/tiers, e.g. access, edge or core in order to reduce the resource consumption and provide highly efficient defense mechanisms.

According to one or more embodiments, when one or several wireless devices are suspected of malicious behavior, the network management can rely on different virtual security appliances (VSA) (for example, the trained artificial intelligence (AI)/machine learning (ML) model) to locate the optimal place(s) to put additional VSA instances (also referred to as VSAs) with the optimal functionality to monitor traffic associated with a group of wireless devices. In one or more embodiments, traffic can be steered using SDN (e.g., software-defined networking) or other techniques, which may allow a VSA to avoid extra load. In one or more embodiments, a multi-tier strategy is used in finding/determining places/location in the network to place VSAs in order to narrow down the set of suspected wireless devices (i.e., wireless devices suspected of malicious behavior). These places/locations within the network may be optimal locations that are placed physically and/or logically closer to the suspected wireless device. This may be performed by instantiating the finer grained VSA and placing them appropriately in the network in order to cover smaller and smaller sets of suspected wireless devices. This way, the defense boundary is pushed or located closer to the sources of the attack, i.e., malicious wireless devices.

In one or more embodiments, a "gradual" approach to the detection is implemented, based on using VSA at different levels of granularity, placed accordingly to cover/monitor an appropriate or predefined number of suspect wireless devices in the network. At the high level, the boundary to defend the operator's network is set up and adjusted dynamically based on the outcome of the virtual security assurance prediction model (for example, AI/ML based anomaly detection, classification or/and prediction).

In one or more embodiments, when the suspected wireless devices move from one location to another (e.g., from one cell to another cell), the security orchestrator (SO) works in sync with the mobility management in the operator's network so as to coordinate the move of the wireless device investigation to other VSAs in order to follow moving wireless device(s), which may allow new VSAs to be place physically and/or logically near the wireless device(s) after the move/handover. At the finest grained level, when a VSA is assigned to a wireless device, the VSA moves with the wireless device or changes its location in order to cover the multi-access approach (when wireless device changes access method). In one or more embodiments, at the finest grained level of the process, a single VSA is assigned to a single suspected wireless device.

According to one aspect of the present disclosure, an orchestrator node is provided. The orchestrator node includes processing circuitry configured to: receive, from a first virtual security agent, VSA, an indication of a first plurality of wireless devices where each wireless device of the first plurality of wireless devices meets a first criteria associated with a first level of monitoring of bi-directional network communications; in response to the indication of the first plurality of wireless devices, configure a second VSA to monitor communications associated with each of the first plurality of wireless devices; receive, from the second VSA, an indication of a first subset of the first plurality of wireless devices where each wireless device of the first subset of the first plurality of wireless devices meets a second criteria associated with a second level of monitoring of bi-directional network communications; and determine to modify a granularity of wireless device monitoring of bi-directional network communications based at least on the indication of the first subset of the first plurality of wireless devices.

According to some embodiments of this aspect, the first VSA is configured in a first node and the second VSA is configured in a second node different from the first node. According to some embodiments of this aspect, the processing circuitry is further configured to, in response to the indication of the first plurality of wireless devices, configure a plurality of VSAs to monitor communications associated with each of the first plurality of wireless devices, the plurality of VSAs including the second VSA, where each of the plurality of VSAs is associated with a same logical level of granularity of wireless device monitoring of bi-directional network communications. According to some embodiments of this aspect, the plurality of VSAs are positioned at a plurality of physical locations within a network based at least on a number of the first plurality of wireless devices.

According to some embodiments of this aspect, the plurality of VSAs correspond to the second VSA and at least one clone of the second VSA. According to some embodiments of this aspect, plurality of VSAs are configured to inspect the bi-directional network communications at a protocol level different from a protocol level used by the first VSA. According to some embodiments of this aspect, the first node is one of: a first type of logical node, in a core network, that is different from a second type of logical node, in the core network, associated with the second node, part of the core network while the second node is part of an access network, and in a first type of physical node, in the access network, that is different from a second type of physical node, in the access network, associated with the second node.

According to some embodiments of this aspect, the processing circuitry is configured to determine a location within a network to configure the second VSA where the determined location configured to provide the second VSA access to bi-directional network communications of the first plurality of wireless devices for the monitoring of the first plurality of wireless devices, and the determined location is based at least on a number the first plurality of wireless devices. According to some embodiments of this aspect, the processing circuitry is further configured to cause at least a portion of the bi-direction network communication of the first plurality of wireless devices to be steered toward the second VSA. According to some embodiments of this aspect, the processing circuitry is further configured to receive, from a third VSA, an indication of a second subset of the first subset of the plurality of wireless devices, each wireless device of the second subset meeting a third criteria associated with a third level of monitoring of bi-directional network communications.

According to some embodiments of this aspect, the processing circuitry is further configured to configure a third VSA to monitor communications associated with the first subset of the first plurality of wireless devices, the first subset of the first plurality of wireless devices including only a first wireless device. According to some embodiments of this aspect, the processing circuitry is further configured to: receive monitoring data, from the third VSA, associated with the first wireless device, and determine the first wireless device is associated with at least one network attack. According to some embodiments of this aspect, the processing circuitry is further configured to configure the first VSA in response to at least one network behavior of the first wireless device.

According to some embodiments of this aspect, the processing circuitry is further configured to: determine the first wireless device has participated in a handover process from a first access node to a second access node, and cause the third VSA to move from the first access node to the second access node to continue monitoring the first wireless device. According to some embodiments of this aspect, the modified granularity of wireless device monitoring corresponds to the third VSA being configured to provide a higher granularity of wireless device monitoring than a granularity of wireless device monitoring associated with the second VSA. According to some embodiments of this aspect, the modified granularity corresponds to increasing granularity at least in part by decreasing a number of wireless devices to be monitored.

According to another aspect of the present disclosure, a node in communication with a orchestrator node is provided. The node implements a first monitor a first plurality of wireless devices where each wireless device of the first plurality of wireless devices meets a first criteria associated with a first level of monitoring of bi-directional network communications; determine a first subset of the first plurality of wireless devices meet a second criteria associated with a second level of monitoring of bi-directional network communications different from the first level of monitoring; and indicate the first subset of the first plurality of wireless devices to the orchestrator node for further monitoring by a second VSA.

According to some embodiments of this aspect, the first VSA is configured in a first node that is different from a second node providing the second VSA. According to some embodiments of this aspect, the first node is one of: a first type of logical node, in a core network, that is different from a second type of logical node, in the core network, associated with the second node; part of the core network while the second node is part of an access network, and in a first type of physical node, in the access network, that is different from a second type of physical node, in the access network, associated with the second node. According to some embodiments of this aspect, the first VSA is configured to inspect the bi-direction network communications at a protocol level different from a protocol level used by the second VSA.

According to some embodiments of this aspect, the second level of monitoring is associated with a higher granularity of wireless device monitoring than a granularity of wireless device monitoring associated with the first level of monitoring. According to some embodiments of this aspect, the higher granularity corresponds to a decreased number of wireless devices to be monitored compared to a number of wireless device to be monitored according to the first level of monitoring. According to some embodiments of this aspect, at least a portion of the bi-directional network communications of the first plurality of wireless devices corresponds to communications that are steered to the first VSA.

According to another aspect of the present disclosure, a method implemented by an orchestrator node is provided. An indication of a first plurality of wireless devices is received from a first virtual security agent, VSA, where each wireless device of the first plurality of wireless devices meets a first criteria associated with a first level of monitoring of bi-directional network communications. In response to the indication of the first plurality of wireless devices, a second VSA is configured to monitor communications associated with each of the first plurality of wireless devices. An indication of a first subset of the first plurality of wireless devices is received from the second VSA where each wireless device of the first subset of the first plurality of wireless devices meeting a second criteria associated with a second level of monitoring of bi-directional network communications. A determination is made to modify a granularity of wireless device monitoring of bi-directional network communications based at least on the indication of the first subset of the first plurality of wireless devices.

According to some embodiments of the present disclosure, the first VSA is configured in a first node and the second VSA is configured in a second node different from the first node. According to some embodiments of the present disclosure, in response to the indication of the first plurality of wireless devices, a plurality of VSAs are configured to monitor communications associated with each of the first plurality of wireless devices where the plurality of VSAs include the second VSA, where each of the plurality of VSAs is associated with a same logical level of granularity of wireless device monitoring of bi-directional network communications. According to some embodiments of the present disclosure, the plurality of VSAs are positioned at a plurality of physical locations within a network based at least on a number of the first plurality of wireless devices.

According to some embodiments of the present disclosure, the plurality of VSAs correspond to the second VSA and at least one clone of the second VSA. According to some embodiments of the present disclosure, plurality of VSAs are configured to inspect the bi-directional network communications at a protocol level different from a protocol level used by the first VSA. According to some embodiments of the present disclosure, the first node is one of: a first type of logical node, in a core network, that is different from a second type of logical node, in the core network, associated with the second node; part of the core network while the second node is part of an access network; and in a first type of physical node, in the access network, that is different from a second type of physical node, in the access network, associated with the second node.

According to some embodiments of the present disclosure, a determination is made of a location within a network to configure the second VSA where the determined location is configured to provide the second VSA access to bi-directional network communications of the first plurality of wireless devices for the monitoring of the first plurality of wireless devices, and where the determined location is based at least on a number the first plurality of wireless devices. According to some embodiments of the present disclosure, at least a portion of the bi-direction network communication of the first plurality of wireless devices is caused to be steered toward the second VSA. According to some embodiments of the present disclosure, an indication of a second subset of the first subset of the plurality of wireless devices is received from a third VSA where each wireless device of the second subset meeting a third criteria associated with a third level of monitoring of bi-directional network communications.

According to some embodiments of the present disclosure, a third VSA is configured to monitor communications associated with the first subset of the first plurality of wireless devices where the first subset of the first plurality of wireless devices includes only a first wireless device. According to some embodiments of the present disclosure, monitoring data is received from the third VSA and is associated with the first wireless device. A determination is made that the first wireless device is associated with at least one network attack. According to some embodiments of the present disclosure, the first VSA is configured in response to at least one network behavior of the first wireless device.

According to some embodiments of the present disclosure, a determination is made that the first wireless device has participated in a handover process from a first access node to a second access node. The third VSA is caused to move from the first access node to the second access node to continue monitoring the first wireless device. According to some embodiments of the present disclosure, the modified granularity of wireless device monitoring corresponds to the third VSA being configured to provide a higher granularity of wireless device monitoring than a granularity of wireless device monitoring associated with the second VSA. According to some embodiments of the present disclosure, the modified granularity corresponds to increasing granularity at least in part by decreasing a number of wireless devices to be monitored.

According to another aspect of the present disclosure, a method implemented by a node that is in communication with a orchestrator node is provided. The node implements a first virtual security agent, VSA. A first plurality of wireless devices are monitored where each wireless device of the first plurality of wireless devices meet a first criteria associated with a first level of monitoring of bi-directional network communications. A determination is made that a first subset of the first plurality of wireless devices meet a second criteria associated with a second level of monitoring of bi-directional network communications different from the first level of monitoring. The first subset of the first plurality of wireless devices are indicated to the orchestrator node for further monitoring by a second VSA.

According to some embodiments of this aspect, the first VSA is configured in a first node that is different from a second node providing the second VSA. According to some embodiments of this aspect, the first node is one of: a first type of logical node, in a core network, that is different from a second type of logical node, in the core network, associated with the second node; part of the core network while the second node is part of an access network; and in a first type of physical node, in the access network, that is different from a second type of physical node, in the access network, associated with the second node. According to some embodiments of this aspect, the first VSA is configured to inspect the bi-direction network communications at a protocol level different from a protocol level used by the second VSA.

According to some embodiments of this aspect, the second level of monitoring is associated with a higher granularity of wireless device monitoring than a granularity of wireless device monitoring associated with the first level of monitoring. According to some embodiments of this aspect, the higher granularity corresponds to a decreased number of wireless devices to be monitored compared to a number of wireless device to be monitored according to the first level of monitoring. According to some embodiments of this aspect, at least a portion of the bi-directional network communications of the first plurality of wireless devices corresponds to communications that are steered to the first VSA.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
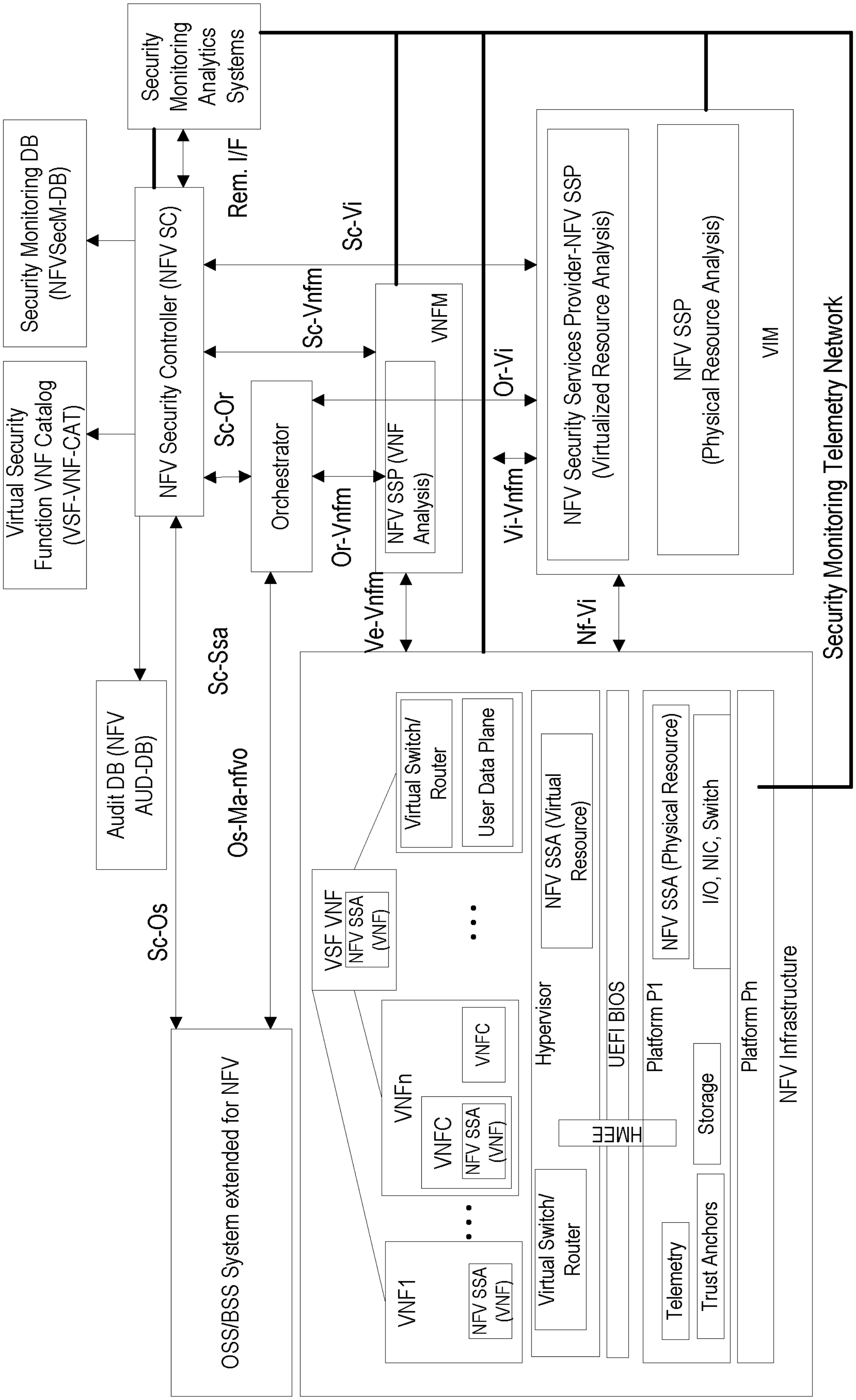
FIG. 1 is a diagram of a security management architecture.
Figure 2:
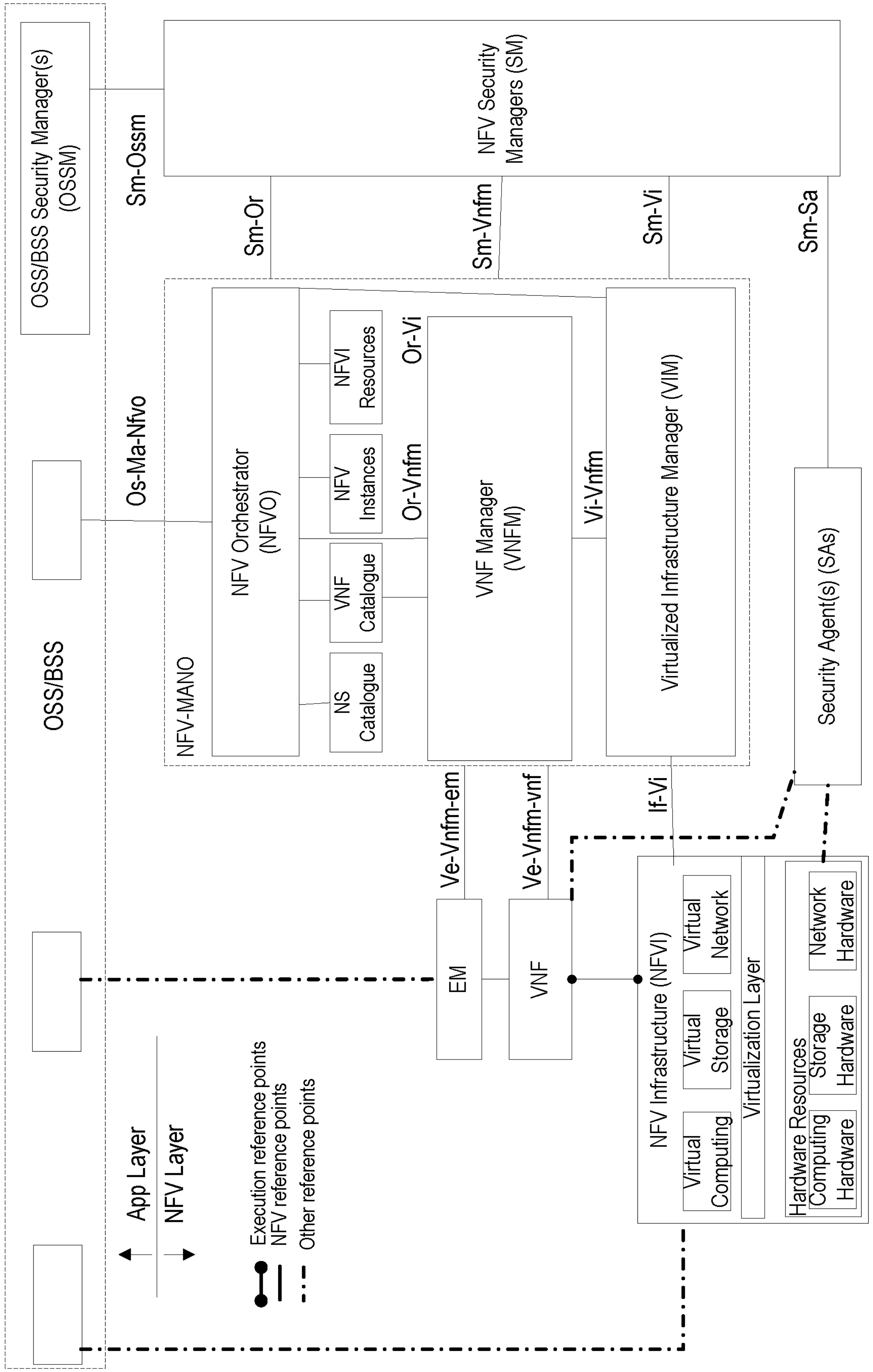
FIG. 2 is a diagram of another security management architecture.

Before describing in detail example embodiments, it is noted that the embodiments reside primarily in combinations of apparatus components and processing steps related to dynamic virtual security agent (VSA) based monitoring in a network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide dynamic virtual security agent (VSA) based monitoring in a network.

Figure 3:
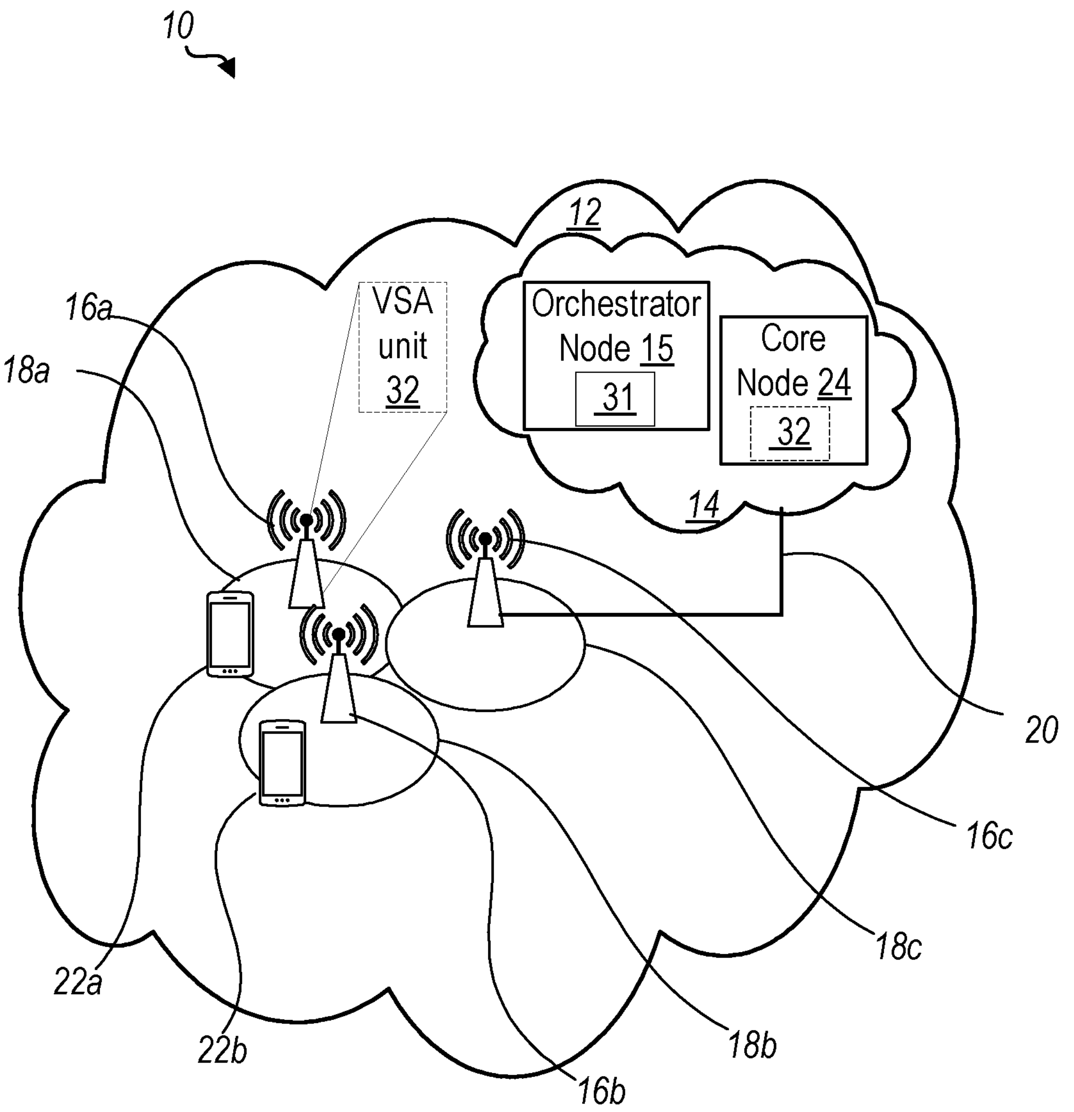
FIG. 3 is a schematic diagram of an example network architecture illustrating a communication system according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

Core network 14 includes an orchestrator node 15 is configured to include orchestrator unit 31 that is configured to perform one or more orchestrator node 15 functions as described herein such as with respect to monitoring communications associated with one or more wireless devices 22. For example, orchestrator node 15 may cause one or more one or more virtual security agents 32 (collectively referred to as VSAs 32) to be instantiated in one or more entities in core network 14, access network 12, etc. In some embodiments, a network node 16 is configured to include a VSA 32 which is configured to perform one or more VSA actions as described herein such as with respect to monitoring communications associated with one or more wireless devices 22. Further, core network 14 may include one or more core nodes 24 (collectively referred to as core node 24). Core node 24 may include one or more VSAs 32 as configured by orchestrator node 15 as described herein.

Example implementations, in accordance with an embodiment, of the WD 22, network node 16, orchestrator node 15 and core node 24 discussed in the preceding paragraphs will now be described with reference to FIG. 4. In a communication system 10, a core node 24 comprises hardware (HW) 38 including a communication interface 40 configured to set up and maintain a communication with one or more of network node 16, orchestrator node 15, other core nodes 24, etc. The core node 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by core node 24. Processor 44 corresponds to one or more processors 44 for performing code node 24 functions described herein. The core node 24 includes memory 46 that is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to core node 24. The instructions may be software associated with the core node 24.

The software 48 may be executable by the processing circuitry 42. The processing circuitry 42 of the core node 24 may include VSA unit 32 (also referred to as VSA 32) that is configured to perform one or more core node 24 functions related to monitoring communications associated with one or more wireless devices 22.

The communication system 10 further includes a network node 16 provided in a communication system 10 and including hardware 58 enabling it to communicate with the core node 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the core node 24. The connection 66 may be direct or it may pass through a core network 14 of the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include VSA unit 32 configured to monitoring communications associated with one or more wireless devices 22, as described herein.

The communication system 10 further includes orchestrator node 15 already referred to. The orchestrator node 15 may have hardware 76 that may include communication interface 78 configured to set up and maintain a communication connection 66 with one or more nodes entities in system 10 such as with network node 16, core node 24 in the core network 14, etc.

The hardware 76 of the orchestrator node 15 further includes processing circuitry 80. The processing circuitry 80 may include a processor 82 and memory 84. In particular, in addition to or instead of a processor, such as a central processing unit, and memory, the processing circuitry 80 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 82 may be configured to access (e.g., write to and/or read from) memory 84, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the orchestrator node 15 may further comprise software 86, which is stored in, for example, memory 84 at the orchestrator node 15, or stored in external memory (e.g., database, storage array, network storage device, etc.) accessible by the orchestrator node 15. The software 86 may be executable by the processing circuitry 80.

The processing circuitry 80 may be configured to control any of the methods and/or processes described herein and/or to cause such methods, and/or processes to be performed, e.g., by orchestrator node 15. The processor 82 corresponds to one or more processors 82 for performing orchestrator node 15 functions described herein. The orchestrator node 15 includes memory 84 that is configured to store data, programmatic software code and/or other information described herein. In some embodiments, the software 86 may include instructions that, when executed by the processor 82 and/or processing circuitry 80, causes the processor 82 and/or processing circuitry 80 to perform the processes described herein with respect to orchestrator node 15. For example, the processing circuitry 80 of the orchestrator node 15 may include an orchestrator unit 31 configured to perform one or more orchestrator node 15 functions as described herein such as with respect to monitoring/investigating communications associated with one or more wireless devices 22. In another example, the processing circuitry 80 of the orchestrator node 15 may include a VSA 32 configured to perform one or more orchestrator node 15 functions as described herein such as with respect to monitoring/investigating communications associated with one or more wireless devices 22.

The communication system 10 further includes the WD 22 already referred to. The WD 22 may have hardware 88 that may include a radio interface 90 configured to set up and maintain a wireless connection 64 with a network node 16 serving a coverage area 18 in which the WD 22 is currently located. The radio interface 90 may be formed as or may include, for example, one or more RF transmitters, one or more RF receivers, and/or one or more RF transceivers.

The hardware 88 of the WD 22 further includes processing circuitry 92. The processing circuitry 92 may include a processor 94 and memory 96. In particular, in addition to or instead of a processor, such as a central processing unit, and memory, the processing circuitry 92 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 94 may be configured to access (e.g., write to and/or read from) memory 96, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 98, which is stored in, for example, memory 96 at the WD 22, or stored in external memory (e.g., database, storage array, network storage device, etc.) accessible by the WD 22. The software 98 may be executable by the processing circuitry 92. The software 98 may include a client application 100. The client application 100 may be operable to provide a service to a human or non-human user via the WD 22. The client application 100 may interact with the user to generate the user data that it provides.

The processing circuitry 92 may be configured to control any of the methods and/or processes described herein and/or to cause such methods, and/or processes to be performed, e.g., by WD 22. The processor 94 corresponds to one or more processors 94 for performing WD 22 functions described herein. The WD 22 includes memory 96 that is configured to store data, programmatic software code and/or other information described herein. In some embodiments, the software 98 and/or the client application 100 may include instructions that, when executed by the processor 94 and/or processing circuitry 92, causes the processor 94 and/or processing circuitry 92 to perform the processes described herein with respect to WD 22.

Figure 4:
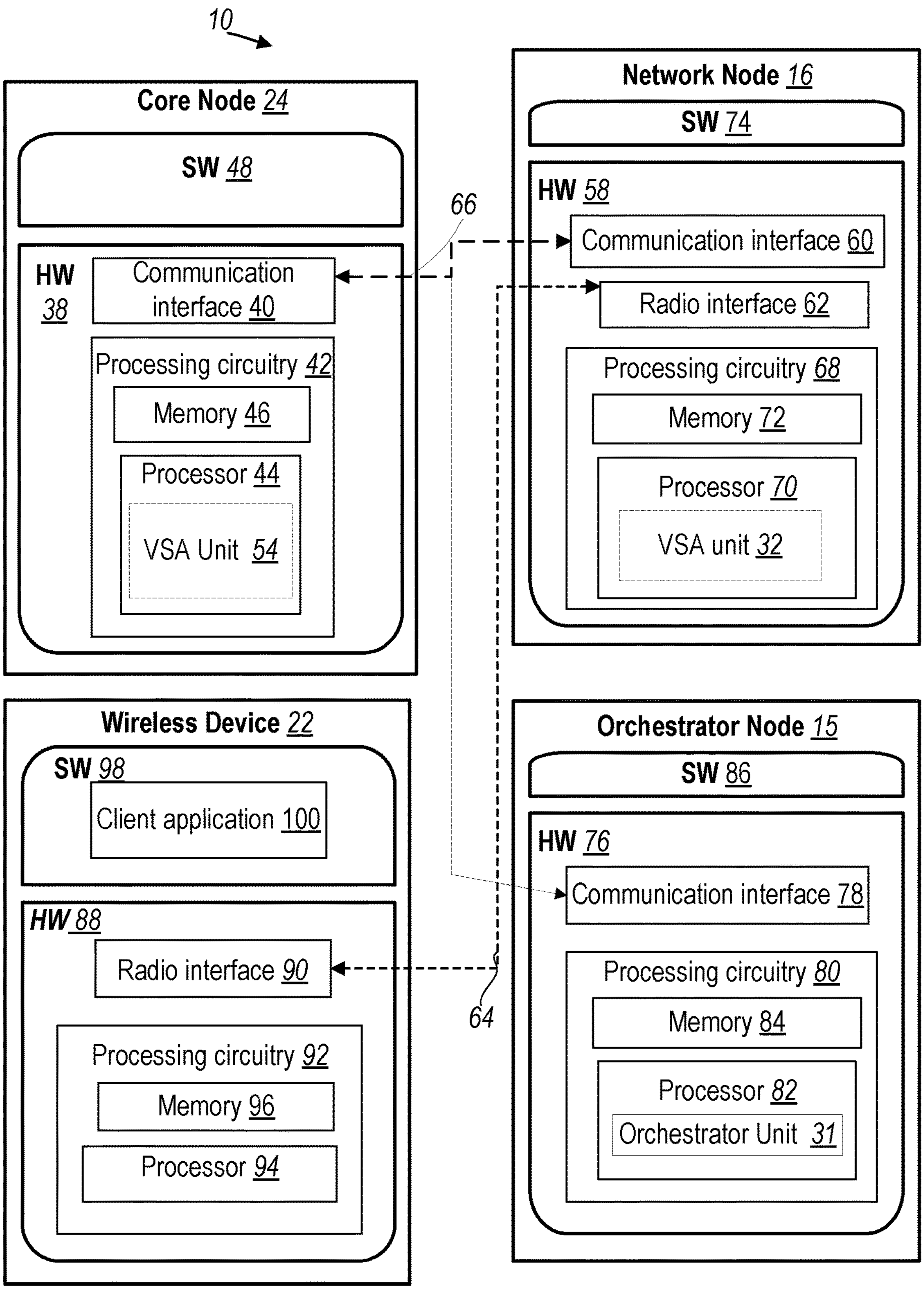
FIG. 4 is a block diagram of several entities in the communication system according to some embodiments of the present disclosure.

In some embodiments, the inner workings of the network node 16, orchestrator node 15, WD 22, and core node 24 may be as shown in FIG. 4 and independently, the surrounding network topology may be that of FIG. 3. The wireless connection 64 between the WD 22 and the network node 16 is in accordance with the teachings of the embodiments described throughout this disclosure.

Although FIGS. 3 and 4 show various "units" such as orchestrator unit 31 and VSA unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
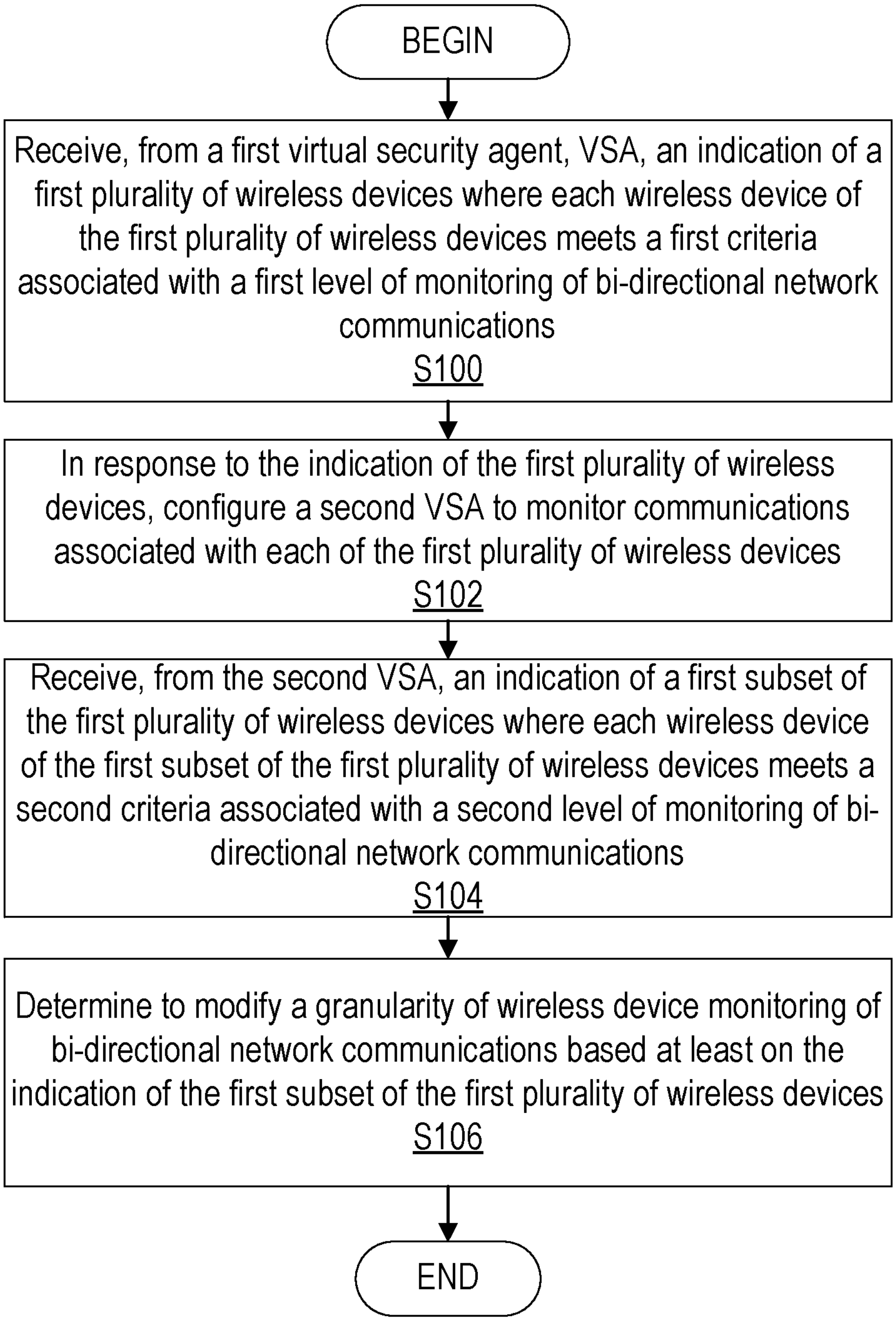
FIG. 5 is a flowchart of an example process in a orchestrator node according to some embodiments of the present disclosure.

FIG. 5 is a flowchart of an example process in an orchestrator node 15 according to one or more embodiments of the present disclosure. One or more blocks described herein may be performed by one or more elements of orchestrator node 15 such as by one or more of processing circuitry 80 (including the orchestrator unit 31), processor 82, and/or communication interface 78. Orchestrator node 15 is configured to receive (Block S100), from a first virtual security agent, VSA 32, an indication of a first plurality of wireless devices 22, each wireless device 22 of the first plurality of wireless devices 22 meeting a first criteria associated with a first level of monitoring of bi-directional network communications, as described herein. In particular, as used herein in one or more embodiments, level (e.g., first level, second level) may corresponds to a hierarchy in a network architecture where a lower level is physically and/or logically closer to an edge node and/or wireless device 22 than a higher level. In one or more embodiments as used herein, level (e.g., first level, second level) may corresponds to a physical distance range of one or more network entities from one or more wireless device 22. For example, one or more different network entities may be included in the same level as these one or more different network entities are in a predefined range from one or more wireless devices 22. Hence, in this example, level is defined in terms of being closer or further from suspected UEs in which the level may or may not correspond to a particular network hierarchy.

Each level may correspond a Orchestrator node 15 is configured to, in response to the indication of the first plurality of wireless devices 22, configure (Block S102) a second VSA 32 to monitor communications associated with each of the first plurality of wireless devices 22, as described herein. Orchestrator node 15 is configured to receive (Block S104), from the second VSA 32, an indication of a first subset of the first plurality of wireless device 22*s*, each wireless device 22 of the first subset of the first plurality of wireless devices 22 meeting a second criteria associated with a second level of monitoring of bi-directional network communication, as described herein. Orchestrator node 15 is configured to determine (Block S106) to modify a granularity of wireless device 22 monitoring of bi-directional network communications based at least on the indication of the first subset of the first plurality of wireless devices 22, as described herein.

According to some embodiments, the first VSA 32 is configured in a first node and the second VSA 32 is configured in a second node different from the first node. According to some embodiments, the processing circuitry 80 is further configured to, in response to the indication of the first plurality of wireless devices 22, configure a plurality of VSAs 32 to monitor communications associated with each of the first plurality of wireless devices 22, the plurality of VSAs 32 including the second VSA 32, where each of the plurality of VSAs 32 is associated with a same logical level of granularity of wireless device 22 monitoring of bi-directional network communications. According to some embodiments, the plurality of VSAs 32 are positioned at a plurality of physical locations within a network based at least on a number of the first plurality of wireless devices 22.

According to some embodiments, the plurality of VSAs 32 correspond to the second VSA 32 and at least one clone of the second VSA 32. According to some embodiments, plurality of VSAs 32 are configured to inspect the bi-directional network communications at a protocol level different from a protocol level used by the first VSA 32. According to some embodiments, the first node is one of: a first type of logical node, in a core network 14, that is different from a second type of logical node, in the core network 14, associated with the second node, part of the core network 14 while the second node is part of an access network, and in a first type of physical node, in the access network, that is different from a second type of physical node, in the access network, associated with the second node.

According to some embodiments, the processing circuitry 80 is configured to determine a location within a network to configure the second VSA 32 where the determined location configured to provide the second VSA 32 access to bi-directional network communications of the first plurality of wireless devices 22 for the monitoring of the first plurality of wireless devices 22, and the determined location is based at least on a number the first plurality of wireless devices 22. According to some embodiments, the processing circuitry 80 is further configured to cause at least a portion of the bi-direction network communication of the first plurality of wireless devices 22 to be steered toward the second VSA 32. According to some embodiments, the processing circuitry 80 is further configured to receive, from a third VSA 32, an indication of a second subset of the first subset of the plurality of wireless devices 22, each wireless device 22 of the second subset meeting a third criteria associated with a third level of monitoring of bi-directional network communications.

According to some embodiments, the processing circuitry 80 is further configured to configure a third VSA 32 to monitor communications associated with the first subset of the first plurality of wireless devices 22, the first subset of the first plurality of wireless devices 22 including only a first wireless device 22. According to some embodiments, the processing circuitry 80 is further configured to: receive monitoring data, from the third VSA 32, associated with the first wireless device 22, and determine the first wireless device 22 is associated with at least one network attack. According to some embodiments, the processing circuitry 80 is further configured to configure the first VSA 32 in response to at least one network behavior of the first wireless device 22.

According to some embodiments, the processing circuitry 80 is further configured to: determine the first wireless device 22 has participated in a handover process from a first access node to a second access node, and cause the third VSA 32 to move from the first access node to the second access node to continue monitoring the first wireless device 22. According to some embodiments, the modified granularity of wireless device 22 monitoring corresponds to the third VSA 32 being configured to provide a higher granularity of wireless device 22 monitoring than a granularity of wireless device 22 monitoring associated with the second VSA 32. According to some embodiments, the modified granularity corresponds to increasing granularity at least in part by decreasing a number of wireless devices 22 to be monitored.

Figure 6:
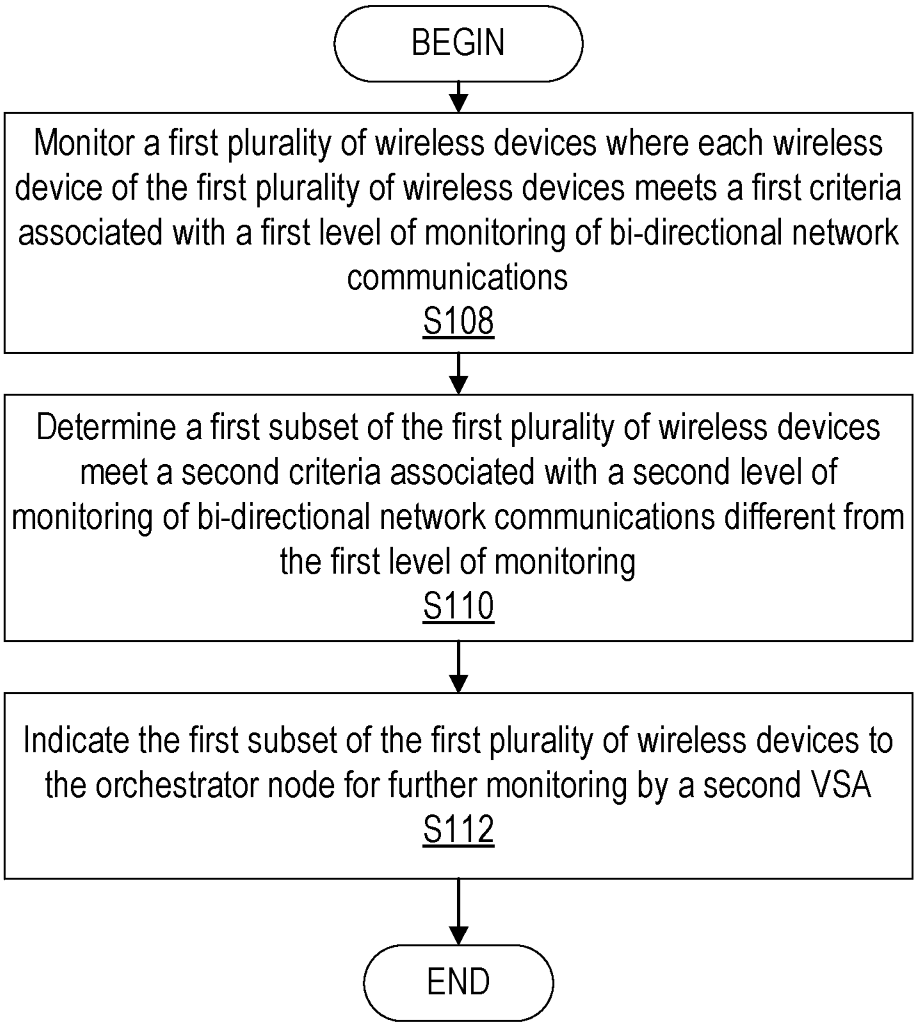
FIG. 6 is a flowchart of an example process in a VSA according to some embodiments of the present disclosure.

FIG. 6 is a flowchart of an example process in a node 14/16 implementing a VSA 32 according to some embodiments of the present disclosure. The node may be a core node 24 or a network node 16, for example. One or more blocks described herein may be performed by one or more elements of core node 24 such as by one or more of processing circuitry 42 (including the VSA unit 32), processor 44, and/or communication interface 40, and/or one or more elements of network node 16 such as one or more of processing circuitry 68, processor 70, VSA unit 32, communication interface 60, etc. Node is configured to monitor (Block S108) a first plurality of wireless devices 22 where each wireless device 22 of the first plurality of wireless devices 22 meets a first criteria associated with a first level of monitoring of bi-directional network communications, as described herein. Node 14/16 is configured to determine (Block S110) a first subset of the first plurality of wireless devices 22 meet a second criteria associated with a second level of monitoring of bi-directional network communications different from the first level of monitoring, as described herein. Node 14/16 is configured to indicate (Block S112) the first subset of the first plurality of wireless devices 22 to an orchestrator node 15 for further monitoring by a second VSA 32.

According to some embodiments, the first VSA 32 is configured in a first node that is different from a second node providing the second VSA. According to some embodiments, the first node is one of: a first type of logical node, in a core network 14, that is different from a second type of logical node, in the core network 14, associated with the second node; part of the core network 14 while the second node is part of an access network, and in a first type of physical node, in the access network, that is different from a second type of physical node, in the access network, associated with the second node. According to some embodiments, the first VSA 32 is configured to inspect the bi-direction network communications at a protocol level different from a protocol level used by the second VSA 32.

According to some embodiments, the second level of monitoring is associated with a higher granularity of wireless device 22 monitoring than a granularity of wireless device 22 monitoring associated with the first level of monitoring. According to some embodiments, the higher granularity corresponds to a decreased number of wireless devices 22 to be monitored compared to a number of wireless device 22 to be monitored according to the first level of monitoring. According to some embodiments, at least a portion of the bi-directional network communications of the first plurality of wireless devices 22 corresponds to communications that are steered to the first VSA 32.

Having described the general process flow of arrangements of the disclosure and having provided examples of hardware and software arrangements for implementing the processes and functions of the disclosure, the sections below provide details and examples of arrangements for monitoring/investigating communications associated with one or more wireless devices.

Some embodiments provide an orchestrator node 15 that manages one or more VSAs 32 for monitoring/investigating one or more wireless devices 22.

One or More Assumptions That may be Used Herein are Listed Below

- 5G network with support for virtualization, edge computing, multi-access edge computing (MEC)
- Wireless devices 22 have multi-access to the operator network. For simplicity, only two of the following accesses technologies are used: 5G, WiFi, although the teachings described herein are equally applicable other access technologies.
- VSA 32 can operate in different places in the network 12/14. Examples for 5G NSA including one or more of packet data network (PDN)-gateway (GW), serving gateway (S-GW), gNB or edge network nodes, which may be a type of network node 16 and/or core node 24.

Attack Scenario:

- The malicious wireless devices 22 (e.g., UEs, IoT devices connected through 5G networks) in the Telecom network can be used to launch attacks against external targets.
- The attack is not easily detectable and there is need for an efficient approach to detect the attack. For example, it could be that this is a stealthy attack such as a stealth low intensity distributed denial of service (DDoS), etc.
- In this case, it may be assumed that the security orchestrator (i.e., orchestrator node 15) starts its investigation for the targeted web server by launching the VSAs 32 on the Telecom operator's network at the highest level and gradually narrows down the investigation of malicious wireless device(s) 22 as described herein.

VSA 32 Assumption:

- In one or more embodiments, it is assumed that the VSA 32 is an IDS system. However, in one or more embodiments, the VSA 32 may be a firewall, a WAF, a DPI or unmanned aerial system traffic management (UTM) or any other VSA that defines the defense boundaries of the system through network traffic investigation. VSA 32 may be a logical entity implemented by network node 16 and/or core node 24.

In the following, 5G Not Stand Alone (NSA) and/or 5G Stand Alone (SA) terminology may be used. Note that in NSA, the packet data network gateway (P-GW) is used to connect the operator's network to the Internet, while in SA, there may not be such a designated unique user plane function (UPF) to connect to outside the operator's network. Therefore, when using P-GW in NSA in an example, it may be replaced with a UPF connecting directly to the Internet (DC) in an SA example. Note that the same could be applicable in an enterprise setting including a Central office, Regional/Brunch office, and individual workers/users from home. This approach is applicable to any kind of network topology where this hierarchical tree like topology exists.

One or more embodiments described herein, are directed to security issues that may occur in the user plane of a network.

In one or more embodiments, each VSA 32 covers a maximum number (or predefined number) of wireless devices 22 where these wireless devices 22 may be referred to as covered wireless devices 22. Among those covered wireless devices 22, after a time t, the VSA determines that some of the covered wireless devices 22 may be malicious wireless devices 22 (e.g., exhibit behavior meeting a behavior/first criterion). These wireless devices 22 that are determined or tagged as malicious wireless devices 22 are referred to as suspect wireless devices 22.

One or more embodiments include and/or are associated with the following:

- One Goal: Use a gradual approach to refine the security operations by creating virtual SAs (VSA 32) in different places (physical and/or logical locations) in the network 12/14 (e.g., operator's network), to gradually increase the granularity of security functionality by maximizing the coverage by VSA 32 through placement in the network 12/14. The one or more VSAs 32 form a defense boundary in the operator's network for the potential attackers.
- Different VSAs 32 are created in the operator's network to address security issues. The traffic may be steered towards one or more of these VSAs 32 for investigation by the respective VSAs 32. Note that in 5G networks, SDN can be used to steer traffic to one or more of the VSAs. It may be assumed that a component called the security orchestrator (also referred to as orchestrator node 15) is in charge of creating and managing one or more of the VSAs 32. Note that in NFV architecture the role of creating and managing the VSA(s) 32 can be assigned to a security orchestrator in NFV security controller (part of NFVO).
- These VSAs 32 may first be created at the highest level (or a high level) to cover the maximum number of wireless devices 22 (in other words, all wireless devices 22 or a first number of wireless devices 22 are suspected). In one or more examples, this means that the VSA 32 is placed closest to the target web server in the operator's network in order to cover a maximum number (or predefined number) of wireless devices 22, e.g., the target web server may be a PDN GW or any UPF, which may be types of core nodes 24, directly connecting to the Internet. Then as the VSA(s) 32 at this level determine a list of suspected wireless devices 22, and narrow down the source of the attack, the investigation/process moves closer and closer to suspect wireless device(s) 22 with a finer and finer grained investigation method. At each level, the list of suspected wireless device 22 is transmitted to lower level VSAs 32 (created by orchestrator node 15 as described below). The suspected wireless devices 22 transmitted to the other VSAs 32 may then be eliminated from the previous level VSA 32 before being moved to the next level of investigation. For example, the investigation of suspected wireless devices 22 is moved, by orchestrator node 15, from VSA 32 at P-GW (higher level) to one or several VSAs 32 at S-GW (lower level) to better track down the attackers (e.g., a more complex traffic monitoring may be implemented at lower levels). The determination to move the suspected wireless devices 22 to a lower level of investigation may be based on the suspected wireless devices 22 meeting a predefined criteria, e.g., first criteria.
  - At each level, the traffic corresponding only to the suspected wireless devices 22 may be steered towards the VSAs 32 at that level. For example, if there are 10,000 wireless device 22 suspected at level 2 (L2), when the VSA 32 is placed in a S-GW, the traffic corresponding only to those 10,000 wireless devices 22 may be steered to the VSA(s) 32 at L2.
- At the lowest level, a VSA 32 may individually follow/investigate (only one) suspected wireless device 22.
- In case one or more of the suspected wireless devices 22 move in different directions, orchestrator node 15 can determine to split the detection/investigation into two or more VSAs 32 placed in the operator's network to cover all the suspected wireless devices 22, e.g., placed in a different S-GW or UPF.
  - The orchestrator node 15 can determine to clone a VSA 32 into different VSAs 32 and place them in the network to follow/monitor the suspected wireless devices 22. The suspected wireless devices 22's information may then be transferred to the newly cloned VSA 32. The specific details of the state transfer from one VSA 32 to a cloned VSA 32 are outside of the scope of the disclosure.
- The orchestrator node 15 keeps track of all VSAs 32 (e.g., of the plurality of VSAs 32) and when there is no longer a need to investigate the suspected wireless devices 22 by those VSAs 32, orchestrator node 15 deactivates/removes them.
- This approach provides an automatic and dynamic approach to instantiate the appropriate number of VSAs 32 to investigate network attack(s). That is, in one or more embodiments, the VSAs 32 are created based at least on whether a criteria is met by the suspected wireless devices 22 where the criteria may be based on the number of suspected wireless device 22 detected/determined at each level, thereby providing an automatic and dynamic way of adapt the resources dedicated to the defense depending on the attack's intensity. Further, the VSAs 32 may be created based at least on the location(s) of the suspected wireless devices 22 in the network, which may be part of the criteria used for determining whether to create VSAs 32.
- In one or more embodiments described herein provide an efficient investigation process as the finer granularity of investigation is assigned to a limited number of wireless devices 22 which have been narrowed down (i.e., reduced) from higher levels of investigation. Therefore, instead of static IDS investigation, where a static network appliance (e.g., type of network node 16 and/or core node 24) needs to apply fine grained (i.e., costly) investigation to a large number of wireless devices 22, the approach would investigate a selected number of wireless devices 22 with fine granularity. For example, in one or more embodiments, granularity is adapted/modified to the wireless devices 22 which represent higher chances of being malicious, thereby reducing the costly fine grained investigation of a high number of wireless devices 22.

Gradual Investigation According to One or More Embodiments

- There are different levels of investigation, each level of investigation corresponds to a predefined investigation granularity. For example, AI/ML based anomaly detection and classification model can be used with different number of features and complexity. Each level may represent/correspond to a predefined investigation precision for detecting the suspect wireless devices 22. The precision for investigation defines the probability of a correct prediction (e.g., 60% precision means that there is 60% probability the suspected wireless device 22 is actually malicious). Note that at each level the investigation covers all suspected wireless devices 22 associated with that level. For example, a first level may investigate/cover a plurality of wireless devices 22 while a second level (e.g., lower level associated with increased granularity compared to the first level) is configured to investigate/cover a first subset of the plurality of wireless devices 22. Continuing the example, a third level (additional VSA 32) may be configured by orchestrator node 15 to investigate/cover a second subset of the first subset of plurality of wireless devices 22. The third level may be a lower level associated with increased granularity compared to the second level. Further, one or more characteristics of VSA 32 can be considered for each level of investigations, e.g., type of attack to be investigated.

At each level, there may be a triggering condition for switching the investigation from one level to another.

Note there could be several conditions but for the ease of description, in the following, only one condition is considered. The trigger for switching can be performed via the outcome of the AI/ML model.

In the following, it may be assumed that the condition to switch between different levels is the number of suspected wireless devices 22 detected at each level (this is the outcome of the prediction at a higher level). Note that orchestrator node 15 considers the location of these suspected wireless devices 22 to create VSAs 32 at lower level.

Each level may have a maximum number of wireless devices 22 to be considered/investigated (covered wireless devices 22). For example, the highest level VSA 32 covers/monitors 1 million (1 M) wireless devices 22. If there are more than 1 M wireless devices 22 to be monitored at that level, SMU (orchestrator node 15) creates more VSAs of the same level to investigate the additional wireless devices 22.

Note that for simplicity, the number of wireless devices 22 are limited, and each wireless devices 22 is assumed to be located in a different physical location. In one or more embodiments, new wireless devices 22 (i.e., wireless devices 22 added to the network) can be added to at the highest level (highest level of granularity) as they appear.

Each level has a defined precision to detect the suspect wireless device(s) 22. This precision is based on the granularity of the investigation. This precision increases as the investigation moves from higher levels to lower levels based on a more fine-grained investigation at each level lower. That is, each level is associated with a respective granularity of wireless device monitoring/investigation.

For example, VSA L1 (level 1) investigates 1M wireless devices 22 with a precision of 50%, VSA L2 (level 2) investigates 10 K suspected wireless devices 22 with a precision of 70%, VSA L3 (level 3) investigates 100 suspected wireless devices 22 with a precision of 90%, L4 VSA (Individual VSA) investigates 1 wireless device 22, with a precision of 100%. In one or more embodiments, precision X % means that the probability of suspected wireless device 22 to be actually malicious is X %. L1, L2 and L3 may each correspond to a different level of wireless device 22 monitoring as described herein.

In the above example, VSA L1 may be placed in P-GW or the UPF DC (e.g., core nodes 24), VSA L2 on S-GW or intermediary UPFs (e.g., core nodes 24), VSA L3 and VSA L4 on edge network nodes 16/gNB/eNB. Placement of the one or more VSAs 32 may be determined and initiated by orchestrator node 15.

When placing a VSA 32 in the operator's network, the coverage of the number of suspected wireless devices 22 investigated by VSA 32 may always be 100%. This means that, for example, at level 1, in P-GW, the process starts by covering all wireless devices, 10 K wireless devices 22 in this example. In other words, all wireless devices 22 are suspected and are therefore monitored and/or investigated by orchestrator node 15. For the next level, when placing VSA L2 at S-GW, the orchestrator node 15 chooses/determines a place/location in the network to cover all 1 K wireless devices 22. In one or more examples, the L2 VSA(s) are created for every 1K wireless devices 22. This means that orchestrator node 15 may need to find 1K wireless devices 22 from L1 investigation which could be monitored from one S-GW covering all of them. If this is not possible to have 1K wireless devices 22 assigned to any L2 VSA, orchestrator node 15 may not initiate any L2 VSA or may initiate more than one L2 VSA at different locations the L2 VSAs to divide the monitoring/investigation among the L2 VSAs. Note that this max number of suspected wireless devices 22 value (e.g., 1K) are configurable.

At the lowest level (i.e., level with the highest granularity compared to the other level(s)), the VSA 32 corresponds to investigation of an individual wireless device 22. For individual VSAs 32, they could move for the reason of mobility in 5G or for multi-access reasons when the access point for the individual wireless device 22 changes from 5G to WiFi.

At each level, given the level of precision, there is a probability of the wireless devices 22 to be suspected. That is, at a particular level, wireless devices 22 have some probability for the wireless devices 22 to be malicious or not. As VSA(s) 32 are created/instantiated in lower layers and VSAs 32 perform finer grained investigation, the precision of detecting malicious wireless devices 22 increases. Therefore, the investigation is gradual and moves from coarser grained to finer grained investigation.

Note that at each level L, VSAs 32 (e.g., P-GW VSAs) communicate their respective list of suspected wireless devices 22 to orchestrator node 15. Orchestrator node 15 analyzes the possibility of taking some suspect wireless devices 22 from level L to level L−1. For example, orchestrator node 15 analyses and determines to take 1K suspected wireless devices 22 from P-GW VSAs and move them to one or more S-GW VSAs to cover them (e.g., monitor and/or investigate these 1 k suspected wireless devices 22). A new VSA 32 is created at level L−1 (e.g., in S-GW) which covers the suspected wireless devices 22 where the suspected wireless devices 22 are extracted from L VSA (e.g., P-GW) to move to this newly created VSA 32. In level L VSA 32 (e.g., P-GW VSA), these wireless devices 22 could be replaced with new wireless devices 22 or if not possible and there are not enough wireless devices 22, the level L VSAs 32 (e.g., P-GW VSAs) are merged together.

In one or more embodiments, each time a quantity/number of 1K wireless devices 22 is reached in P-GW VSA and it is possible to place the VSA in a S-GW VSA, a new S-GW is created.

Figure 7:
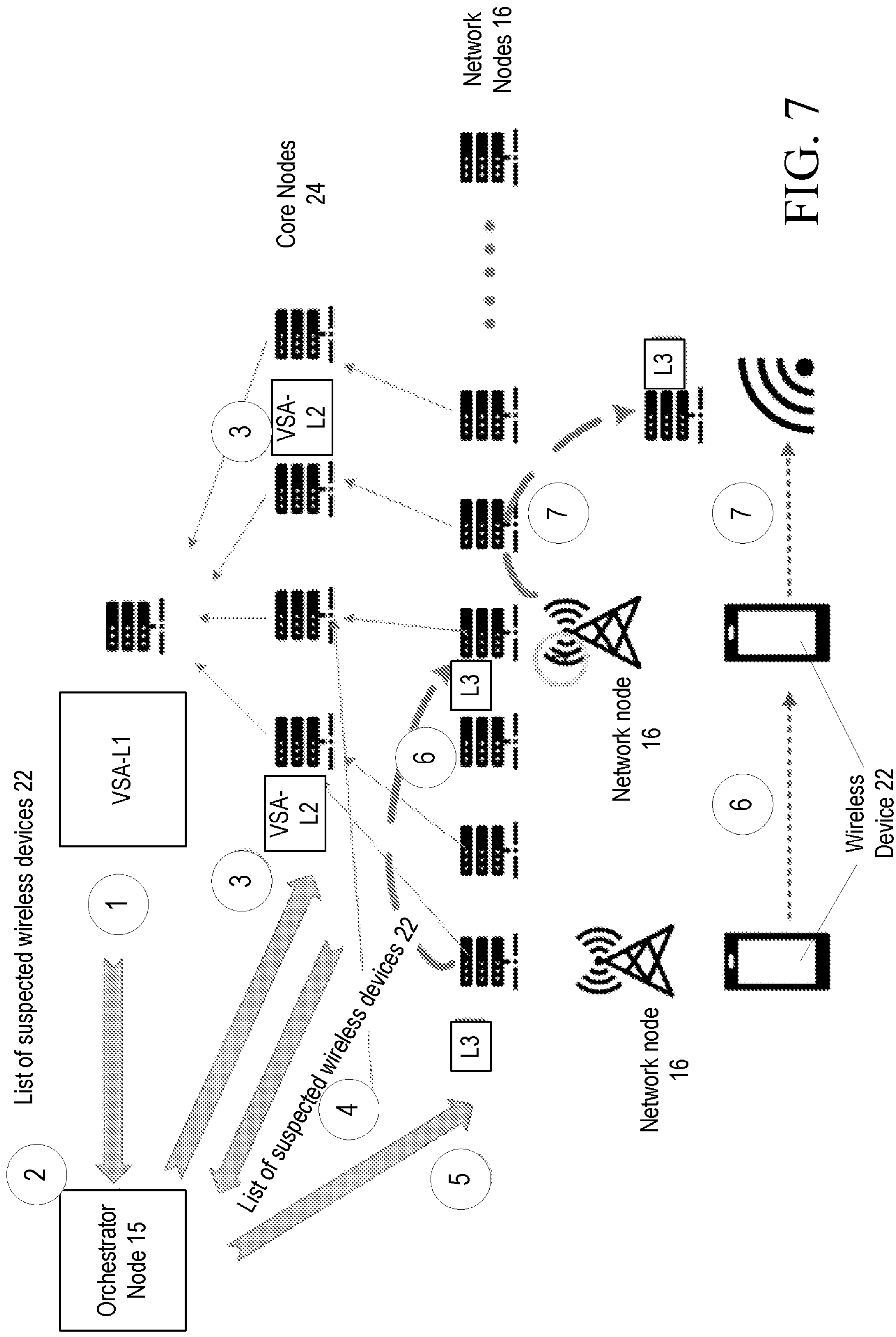
FIG. 7 is a diagram of a process for monitoring one or more wireless devices via one or more levels of monitoring granularity according to some embodiments of the present disclosure.

The Following Discussion is Made with Reference to the Example Illustrated in FIG. 7

1. VSA L1 (i.e., VSA 32*a*) having a coarse grain of wireless device monitoring is initiated by orchestrator node 15.
2. The list of suspected wireless devices 22 are sent to orchestrator node 15. The L2 VSA (i.e., VSA L2, also referred to as VSA 32*b*) are created by orchestrator node 15 based on one or more characteristics (e.g., criteria) associated with the suspected wireless devices 22, e.g., number of suspected wireless devices 22, their coverage, and defined precision. Orchestrator node 15 attempts to reach the designated coverage of suspected wireless devices 22 (e.g., 100% coverage/monitoring), the number of wireless devices 22 at the lower level (e.g., 10K for L2 VSA 32*a*), and place them in the network to provide the 100% coverage (e.g., different S-GWs).
3. VSA L2 32*a* with finer grained investigation are instantiated by orchestrator node 15.
4. The list of suspected wireless devices 22 are sent to orchestrator node 15 by VSA L2.
5. Orchestrator node 15 instantiates the next level VSA 32, i.e., individual VSA 32 investigation for individual wireless devices 22.
6. In one or more embodiments, suspected wireless device (s) 22 move from one network node 16 to another as part of 5G mobility. The SMU or orchestrator node 15 causes the move of the individual VSA 32 with the wireless device 22 from one network node 16 to another network node 16 to continue investigating the wireless device 22, or from one core node 24 to another core node 24, or from a core node 24 to a network node 16 or vice versa.
7. In one or more embodiments, suspected wireless device 22 moves from 5G access mode to another wireless access mode (5G Multi access), the SMU or orchestrator node 15 causes the individual VSA 32 to move from network node 16 to a closest wireless access point to suspected wireless device 22 to continue investigating the wireless device 22. Note that in this case, it is assumed that the network operator manages both access methods by the suspected wireless device 22.

In one or more embodiments, orchestrator node 15 receives the network topology from network functions virtualization orchestra (NFVO)/management and orchestration (MANO) and wireless device 22 location from 5G core or evolved packet core (EPC), in order to be able to find one or more optimal VSA position(s) to cover all wireless devices 22 at one or more levels.

Figure 8:
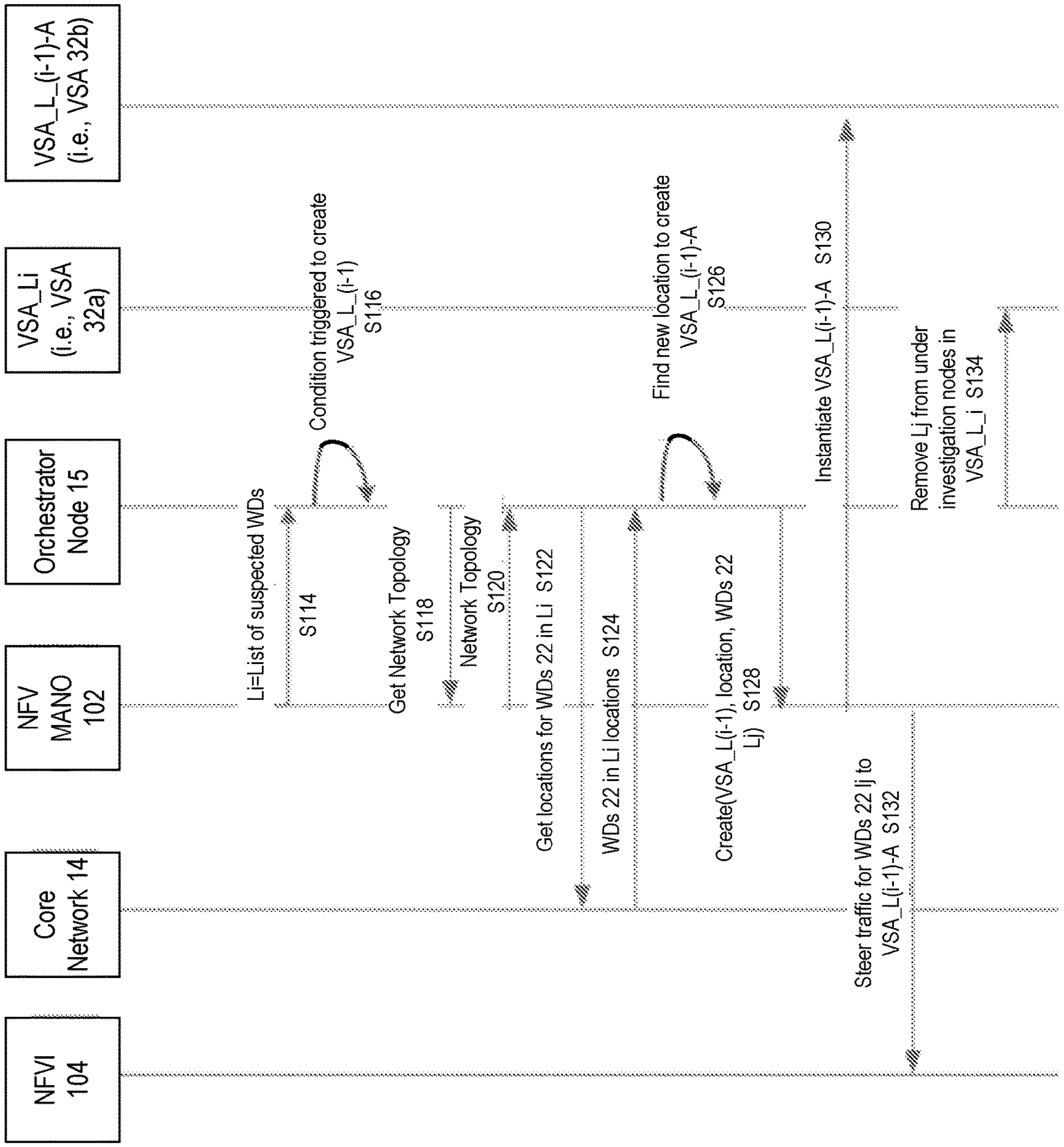
FIG. 8 is a signaling diagram of a process for tracking a suspected wireless device by the creation of a new VSA at a lower level according to some embodiments of the present disclosure.

FIG. 8 is an example signaling diagram according to one or more embodiments of the present disclosure. Orchestrator node 15 is configured to receive (Block S114) a list of suspected wireless devices 22 from NFV MANO 102. In one or more embodiments, the list of suspected wireless devices 22 are under investigation at VSA_Li. Orchestrator node 15 determines (Block S116) whether a condition (e.g., criteria) to create VSA_L_(i−1) has been triggered. For example, the condition may be triggered based at least on the list of suspected wireless devices 22. If the condition has been triggered, orchestrator node 15 request (Block S118) a network topology from the NFV MANO 102 such as via a Get Network Topology request. NFV MANO 102 sends (Block S120) the network topology to orchestrator node 15 based on the request. Orchestrator node 15 requests (Block S122) locations for the wireless devices 22 in the list of suspected wireless devices 22 such as via a Get locations request. Core network 14 transmits (Block S124) the requested locations for the suspected wireless devices 22 in the list.

Orchestrator node 15 determines (Block S126) a new location to create VSA_L_(i−1)-A (i.e., VSA 32*a*) based at least on the location of the suspected wireless devices 22. Orchestrator node 15 transmits (Block S128) a create request/comment to NFV MANO 102, e.g., create (VSA_L (i−1), location, UEs Lj) where the "location" corresponds to the new location determined by orchestrator node 15. NFV MANO 102 causes (Block S130) VSA_L(i−1)-A to be created, e.g., Instantiate VSA_L(i−L)-A. NFV MANO 102 is configured to steer (Block S132) traffic for suspected wireless devices Lj to VSA_L(i−1)-A. Orchestrator node 15 instructs (Block S134) VSA_Li to remove the suspected wireless devices Lj from under investigation in VSA_Li.

Hence, in one or more embodiments, orchestrator node 15 determines to cause a new VSA 32 to be created to monitor a group of suspected wireless devices 22, and also determines the location of the new VSA 32.

Figure 9:
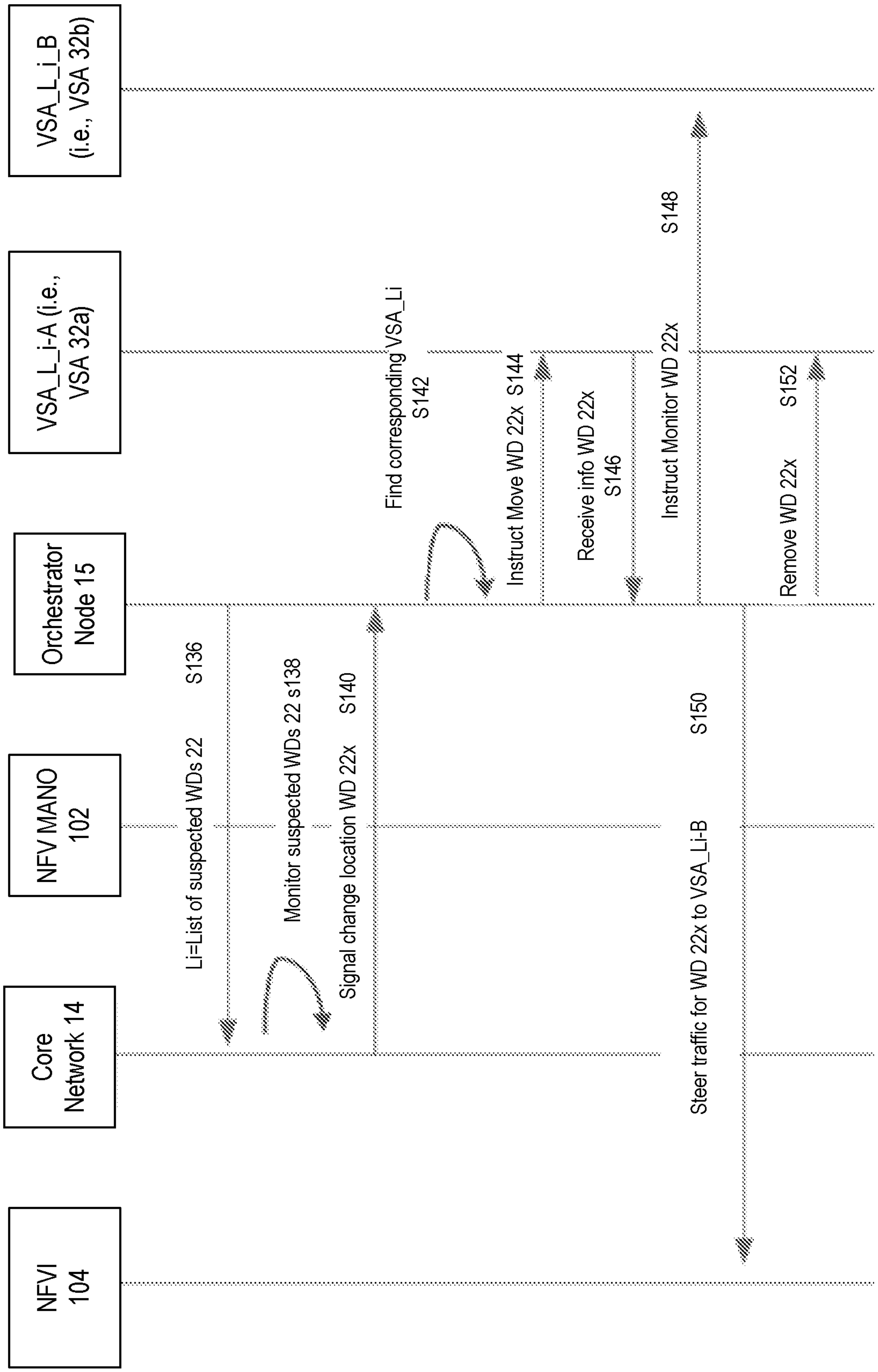
FIG. 9 is a signaling diagram of another process for tracking a suspected wireless device by moving the tracking/monitoring to another VSA according to some embodiments of the present disclosure.

FIG. 9 is another example signaling diagram according to one or more embodiments of the present disclosure. Orchestrator node 15 transmits (S136) a list of suspected wireless devices 22 to the core network 14. The core network 14 monitors (S138) the suspected wireless devices 22. The core network 14 may signal (S140) a change location of wireless devices 22*x* to orchestrator node 15. Orchestrator node 15 determines/finds (S142) corresponding VSA_Li. Orchestrator node 15 instructs or indicates (S144) VSA-Li-A that wireless device 22*x* is to be moved. Orchestrator node 15 receives (S146), from VSA-Li-A, information associated with wireless device 22*x*. Orchestrator node (S148) 15 instructs VSA-Li-B (i.e., VSA 32*b*) to monitor wireless device 22*x*. VSA 32*a* and VSA 32*b* may be collectively referred to as VSA 32. For example, orchestrator node 15 determines that VSA-Li-B is in a better location in the network to monitor wireless device 22*x* after the change in location of wireless device 22*x*. Therefore, orchestrator node 15 instructs VSA-Li-B to monitor wireless device 22*x*. Orchestrator node 15 instructs (S150) NFVI 104 to steer traffic for wireless device 22 to VSA-Li-B. Orchestrator node 15 instructs (S152) VSA-Li-A to remove wireless device 22*x* from monitoring as the monitoring is now being performed by VSA-Li-B.

Hence, in one or more embodiments, orchestrator node 15 dynamically instructs a VSA to pick up monitoring of wireless devices 22 that has moved to a new location.

Therefore, one or more embodiments describe initiating new virtual instances of security appliances (VSAs 32) at different locations in the network, based on one or more of: a gradual approach to refine VSA 32 investigation based on the results from the previous level, exchanging the list of suspected wireless devices 22 between the higher and lower levels, and at each level increasing the granularity of the security investigation, and a triggering condition (e.g., criteria) to initiate new VSAs 32 to refine the investigation from a high level to lower levels at each level, as described herein. The triggering condition (e.g., triggering criteria) may be based on the number of suspected wireless devices 22, the location of one or more of the suspected wireless devices 22 in the network or geographical locations for wireless device 2. Those VSAs 32 being assigned to investigate the suspected wireless devices 22 from previous level of investigation.

Further, one or more embodiments described herein provide one or more of the following advantages:

- Dynamic proactive method(s) of placing VSAs 32 in order to defend the system/network, e.g., investigate anomalies and/or malicious activity in the network to defend/protect the network. A gradual approach to defense: VSAs 32 are placed based on the granularity of the detection/defense in different places to cover the defined number of suspect wireless devices 22.
- Further, based on the results at each level (e.g., level of granularity), new VSA(s) 32 are initiated in order to track the attacker (e.g., suspected wireless device(s) 22) at the appropriate places in the operator's network such as physically and/or logically near the suspected wireless device(s) 22.
- One or more embodiments provide an automatic and dynamic approach to instantiate the appropriate number of VSAs 32 to investigate an attack (the VSAs 32 are created according to the number of suspected wireless devices 22, thereby providing an automatic and dynamic way of using the resources with respect to the attack's intensity).
- One or more embodiments provide an efficient method for investigating entities in the network for malicious/suspicious activity. For example, the higher granularity of investigation is assigned to a limited number of wireless device 22 where this limited number is then narrowed down from higher levels of investigation (e.g., each lower (finer grained) level of investigation is assigned/associated with less wireless devices 22 than the next higher level of investigation). Therefore, instead of static IDS investigation with fix resources dedicated, where a static network appliance needs to apply fine grained (i.e., costly) investigation to a large number of wireless devices 22, the approach described herein investigates a selected number of wireless devices 22 with fine granularity.
- The boundaries at each step can be defined based on the context
- (+) At each step (e.g., level) there is less traffic to be investigated
- (+) Reduce and distribute the load/impact on the overall performance of the network as VSAs are created in different places in the operator's network. The higher levels the granularity have low impact due at least to the limited amount of wireless devices 22 being investigated, thereby reducing the load of investigation on the places in the network operators with higher levels of aggregation. The costs (e.g., resource cost) of investigation per wireless device 22 is lower. However, as the level of granularity increases, the costs per wireless device 22 may increase as the number of investigated wireless devices 22 is lower such that the cost may not increase excessively.
- The individual VSA agent may follow suspected wireless device 22 through one network node 16 to another network node 16 and so forth, to address the mobility and multi-access aspects of the investigation in to suspected wireless device 22.
- Based on the required functions of the VSA 32, a dedicated NSI may be required to guarantee the performance of the network resources to reduce the overall impact of VSA 32 on the data traffic. This can be achieved through a 5G network.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An orchestrator node, comprising:
- processing circuitry configured to:
  - receive, from a first virtual security agent, VSA, an indication of a first plurality of wireless devices, each wireless device of the first plurality of wireless devices meeting a first criterion associated with a first level of monitoring of bi-directional network communications, the bi-directional communications including uplink and downlink communications;
  - determine a first trigger condition based on the indication of the first plurality of wireless devices;
  - in response to the first trigger condition, configure a second VSA to monitor communications associated with each of the first plurality of wireless devices;
  - receive, from the second VSA, an indication of a first subset of the first plurality of wireless devices, each wireless device of the first subset of the first plurality of wireless devices meeting a second criterion associated with a second level of monitoring of the bi-directional network communications;
  - determine a second trigger condition based on the indication of the first subset of the first plurality of wireless devices; and
  - in response to the second trigger condition, determine to modify a granularity of wireless device monitoring of the bi-directional network communications by:
    - applying a higher level of monitoring to the first subset by the second VSA relative to the first plurality of wireless devices; and
    - reducing a number of monitored wireless devices from the first plurality of wireless devices to the first subset.

2. A node in communication with an orchestrator node, the node implementing a first virtual security agent, VSA, the node comprising:
- processing circuitry configured to:
  - monitor, by the first VSA, communications associated with a first plurality of wireless devices, each wireless device of the first plurality of wireless devices meeting a first criterion associated with a first level of monitoring of bi-directional network communications, the bi-directional network communications including uplink and downlink communications;
  - determine, by the first VSA, a first subset of the first plurality of wireless devices, each wireless device of the first subset meeting a second criterion associated with a second level of monitoring of the bi-directional network communications, the second level of monitoring having a higher level of monitoring detail than the first level of monitoring;
  - determine a second trigger condition based on the first subset of the first plurality of wireless devices; and
  - in response to the second trigger condition, provide, to the orchestrator node, an indication of the first subset of the first plurality of wireless devices for further wireless device monitoring at a higher level of granularity by a second VSA by:
    - applying a higher level of monitoring to the first subset by the second VSA relative to the first plurality of wireless devices; and
    - reducing a number of monitored wireless devices from the first plurality of wireless devices to the first subset.

3. A method implemented by an orchestrator node, the method comprising:
- receiving, from a first virtual security agent, VSA, an indication of a first plurality of wireless devices, each wireless device of the first plurality of wireless devices meeting a first criterion associated with a first level of monitoring of bi-directional network communications, the bi-directional communications including uplink and downlink communications;
- determining a first trigger condition based on the indication of the first plurality of devices;
- in response to the first trigger condition, configuring a second VSA to monitor communications associated with each of the first plurality of wireless devices;
- receiving, from the second VSA, an indication of a first subset of the first plurality of wireless devices, each wireless device of the first subset of the first plurality of wireless devices meeting a second criterion associated with a second level of monitoring of the bi-directional network communications;
- determine a second trigger condition based on the indication of the first subset of the first plurality of wireless devices; and
- in response to the second trigger condition, determining to modify a granularity of wireless device monitoring of the bi-directional network communications by:
  - applying a higher level of monitoring to the first subset by the second VSA relative to the first plurality of wireless devices; and
  - reducing a number of monitored wireless devices from the first plurality of wireless devices to the first subset.

4. The method of claim 3, wherein the first VSA is configured in a first node and the second VSA is configured in a second node different from the first node.

5. The method of claim 3, further comprising, in response to the indication of the first plurality of wireless devices, configuring a plurality of VSAs to monitor communications associated with each of the first plurality of wireless devices, the plurality of VSAs including the second VSA; and each of the plurality of VSAs being associated with a same logical level of granularity of wireless device monitoring of bi-directional network communications.

6. The method of claim 5, wherein the plurality of VSAs correspond to the second VSA and at least one clone of the second VSA.

7. The method of claim 5, wherein plurality of VSAs are configured to inspect the bi-directional network communications at a protocol level different from a protocol level used by the first VSA.

8. The method of claim 3, wherein the first node is one of:

a first type of logical node, in a core network, that is different from a second type of logical node, in the core network, associated with the second node;

part of the core network while the second node is part of an access network; and in a first type of physical node, in the access network, that is different from a second type of physical node, in the access network, associated with the second node.

9. The method of claim 4, further comprising determining a location within a network to configure the second VSA, the determined location configured to provide the second VSA access to bi-directional network communications of the first plurality of wireless devices for the monitoring of the first plurality of wireless devices, the determined location being based at least on a number the first plurality of wireless devices.

10. The method of claim 3, further comprising causing at least a portion of the bi-direction network communication of the first plurality of wireless devices to be steered toward the second VSA.

11. The method of claim 3, further comprising one or both:

receiving, from a third VSA, an indication of a second subset of the first subset of the plurality of wireless devices, each wireless device of the second subset meeting a third criteria associated with a third level of monitoring of bi-directional network communications; and configuring a third VSA to monitor communications associated with the first subset of the first plurality of wireless devices, the first subset of the first plurality of wireless devices including only a first wireless device.

12. The method of claim 11, further comprising:

receiving monitoring data, from the third VSA, associated with the first wireless device; and determining the first wireless device is associated with at least one network attack.

13. The method of claim 11, further comprising configuring the first VSA in response to at least one network behavior of the first wireless device.

14. The method of claim 11, further comprising:

determining the first wireless device has participated in a handover process from a first access node to a second access node; and causing the third VSA to move from the first access node to the second access node to continue monitoring the first wireless device.

15. The method of claim 11, wherein the modified granularity of wireless device monitoring corresponds to the third VSA being configured to provide a higher granularity of wireless device monitoring than a granularity of wireless device monitoring associated with the second VSA.

16. The method of claim 3, wherein the modified granularity corresponds to increasing granularity at least in part by decreasing a number of wireless devices to be monitored.

17. A method implemented by a node in communication with a orchestrator node, the node implementing a first virtual security agent, VSA, the method comprising:

monitoring, by the first VSA, communications associated with a first plurality of wireless devices, each wireless device of the first plurality of wireless devices meeting a first criterion associated with a first level of monitoring of bi-directional network communications, the bi-directional network communications including uplink and downlink communications;

determining, by the first VSA, a first subset of the first plurality of wireless devices, each wireless device of the first subset meeting a second criterion associated with a second level of monitoring of the bi-directional network communications, the second level of monitoring having a higher level of monitoring detail than the first level of monitoring;

determining a second trigger condition based on the first subset of the first plurality of wireless devices; and in response to the second trigger condition, providing, to the orchestrator node, an indication of the first subset of the first plurality of wireless devices for further wireless device monitoring at a higher level of granularity by a second VSA by:

applying a higher level of monitoring to the first subset by the second VSA relative to the first plurality of wireless devices; and reducing a number of monitored wireless devices from the first plurality of wireless devices to the first subset.

18. The method of claim 17, wherein the first VSA is configured in a first node that is different from a second node providing the second VSA.

19. The method of claim 18, wherein the first node is one of:

a first type of logical node, in a core network, that is different from a second type of logical node, in the core network, associated with the second node;

part of the core network while the second node is part of an access network; and in a first type of physical node, in the access network, that is different from a second type of physical node, in the access network, associated with the second node.

20. The method of claim 17, wherein the first VSA is configured to inspect the bi-direction network communications at a protocol level different from a protocol level used by the second VSA.

21. The method of claim 17, wherein the second level of monitoring is associated with a higher granularity of wireless device monitoring than a granularity of wireless device monitoring associated with the first level of monitoring, wherein the higher granularity corresponds to a decreased number of wireless devices to be monitored compared to a number of wireless devices to be monitored according to the first level of monitoring.

22. The method of claim 17, wherein at least a portion of the bi-directional network communications of the first plurality of wireless devices corresponds to communications that are steered to the first VSA.

* * * * *